United States Patent
Carter et al.

[11] Patent Number: 5,809,684
[45] Date of Patent: Sep. 22, 1998

[54] AUTOMATIC FISH HOOK SETTING APPARATUS

[76] Inventors: Tommy Lee Carter; Patricia Ann Carter, both of 1755 San Pablo Ave., Seaside, Calif. 93955

[21] Appl. No.: 752,778

[22] Filed: Nov. 20, 1996

Related U.S. Application Data

[63] Continuation of Ser. No. 504,646, Jul. 20, 1995, abandoned, which is a continuation of Ser. No. 315,768, Sep. 30, 1994, abandoned.

[51] Int. Cl.$^6$ .................................................. H01K 97/12
[52] U.S. Cl. .................................................................... 43/16
[58] Field of Search ..................................... 43/16, 17, 15, 43/21.2, 19.2, 43.12

[56] References Cited

U.S. PATENT DOCUMENTS

| | | | |
|---|---|---|---|
| 1,132,158 | 3/1915 | Brower | 43/17 |
| 2,824,404 | 2/1958 | Booth | 43/15 |
| 2,944,360 | 7/1960 | Green | 43/16 |
| 3,699,701 | 10/1972 | Jacobs | 43/15 |
| 4,012,863 | 3/1977 | Lori | 43/43.12 |
| 4,028,837 | 6/1977 | Clark | 43/17 |
| 4,085,536 | 4/1978 | Wood, Jr. | 43/15 |
| 4,354,324 | 10/1982 | Eblen | 43/15 |
| 4,522,572 | 6/1985 | Hahn | 43/17 |

FOREIGN PATENT DOCUMENTS 651306  7/1994  Australia .................................... 43/17

*Primary Examiner*—Joseph J. Hail, III
*Attorney, Agent, or Firm*—David O'Reilly

[57] ABSTRACT

A hook setting apparatus comprised of a post and a telescoping stake for mounting the apparatus on the shore of a lake, river or ocean. The hook setting apparatus is comprised of a trigger release mechanism having a bracket mounted on the post. A trigger release mechanism comprised of a pin and a trigger release lever are secured to a fishing line with the natural flexibility of a fishing pole holding a trigger pin in the trigger release lever. Slack in the fishing line is passed through the trigger release lever and extends beneath the body of water being fished. The trigger release mechanism relies on the natural flexibility of a fishing pole to apply to the force to set a hook. The trigger release lever releases the end of the pin allowing the fishing pole to snap sharply backward, applying considerable force to a fishing line to set a hook. An audible alarm may be mounted on the trigger release mechanism mounting bracket which is activated when the trigger release lever makes contact with a terminal completing a circuit. In a further embodiment, a line extension is added to the trigger release mechanism with an adjustable grip to hold the line when the hook setting apparatus is used on a boat. It maintains slack in the line between the grip and the triggering mechanism to prevent it from being prematurely released when trolling in a boat.

23 Claims, 4 Drawing Sheets

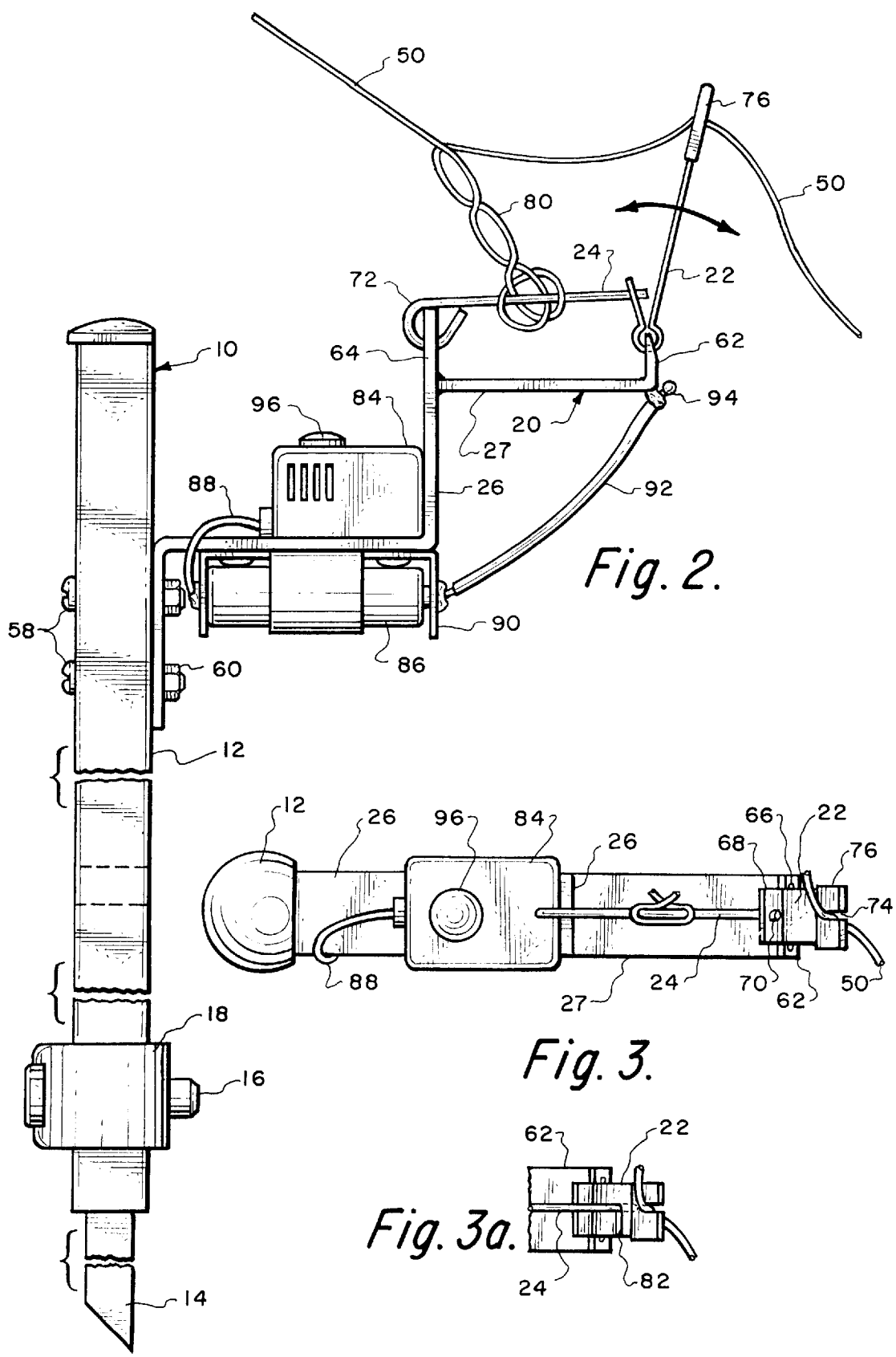

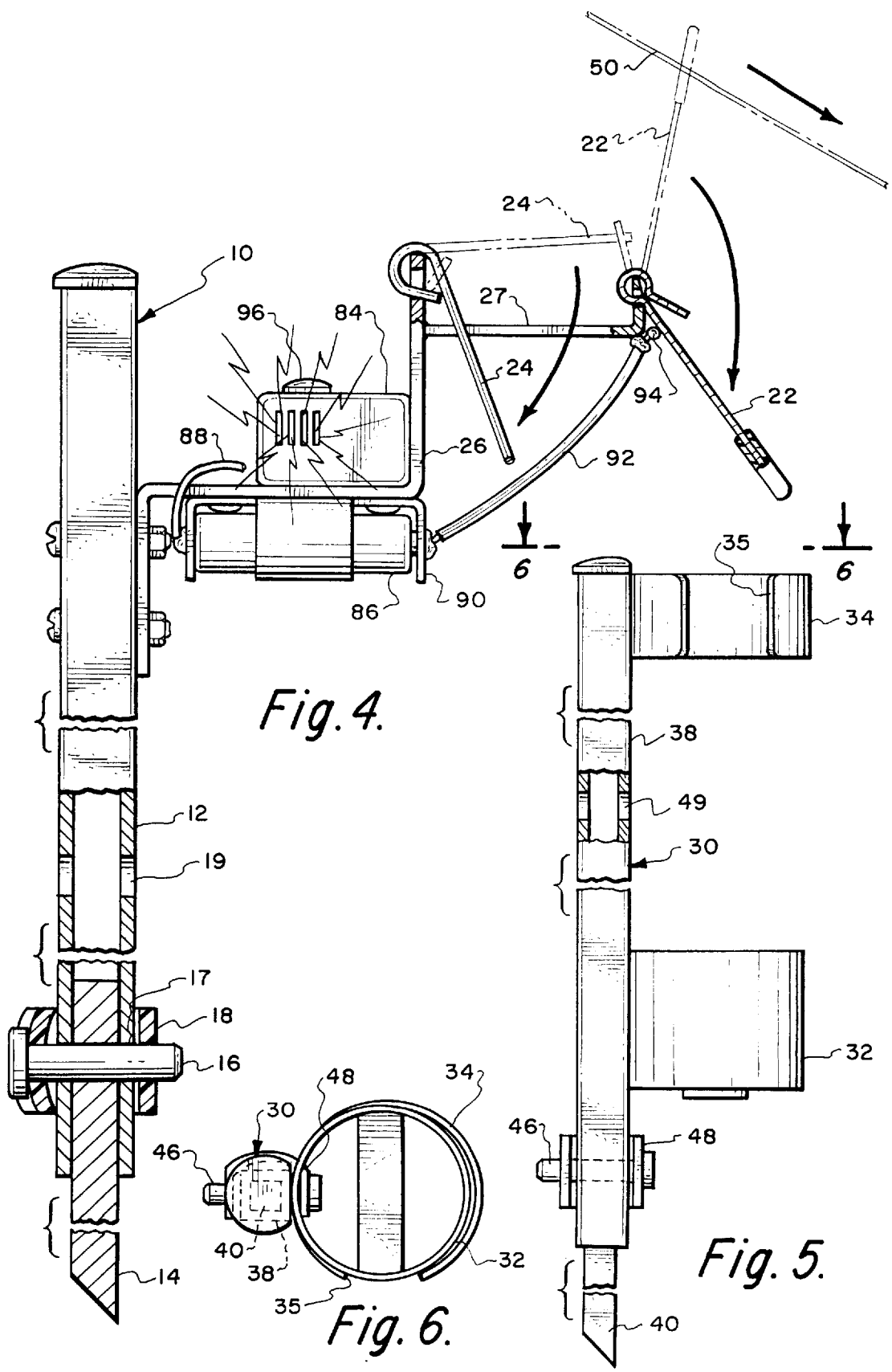

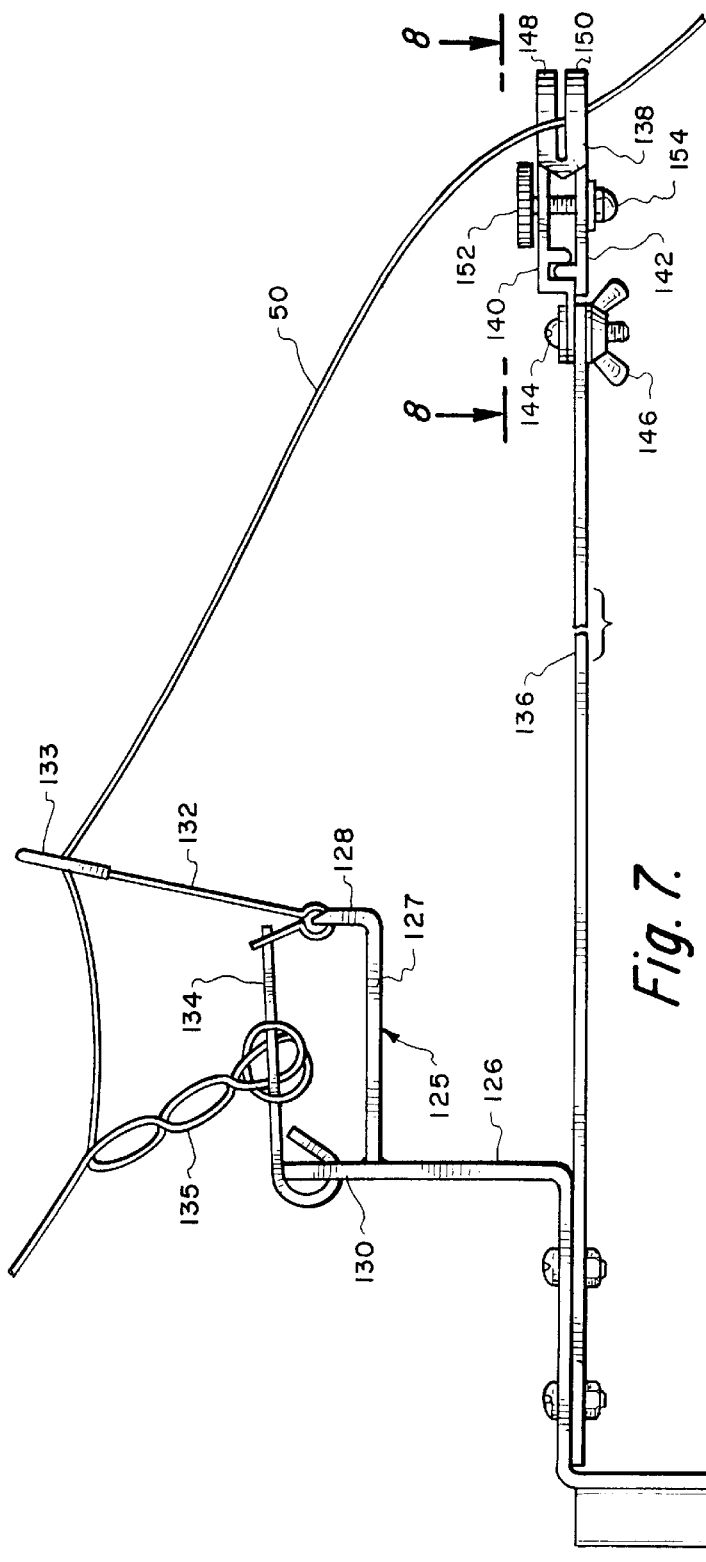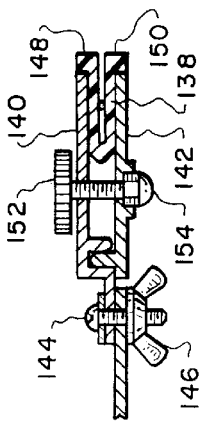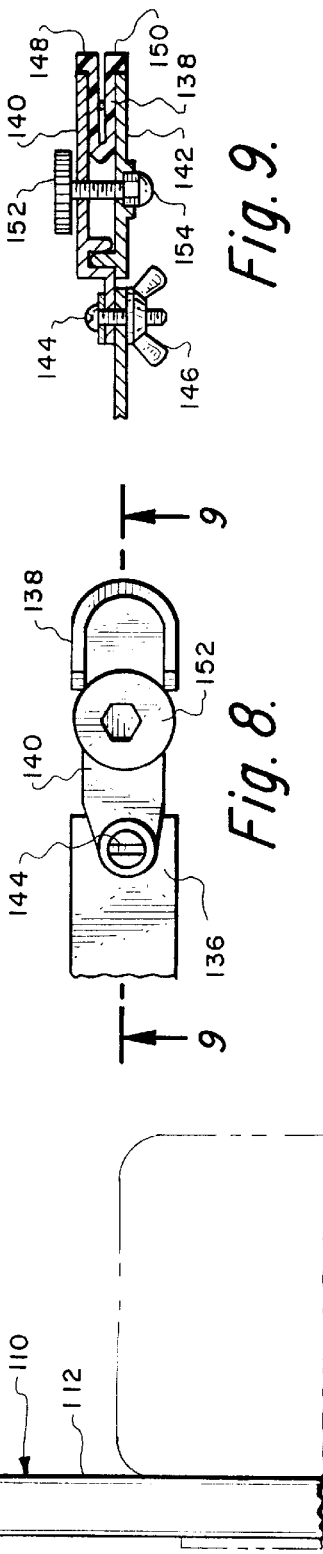

AUTOMATIC FISH HOOK SETTING APPARATUS

This is a continuation of application Ser. No. 08/504,646 filed on Jul. 20, 1995 which is a continuation of application Ser. No. 08/315,768 filed Sep. 30, 1994 and both now abandoned.

BACKGROUND OF THE INVENTION

1. Field of the Invention

This invention relates to fishing accessories and more particularly, relates to a fish hook setting apparatus that will automatically and quickly set a hook when a fish bites.

2. Background Information

There are many available fishing accessories which help a fisherman and assist in catching fish. Many of these devices simply indicate when a fish is biting on the line. Bobbers and other types of devices that indicate when the line is being moved are well known in the art.

There are also devices which assist in setting a hook when a fish bites. Boats, for example, use outriggers that allow a line to be released and snag the fish when he bites on a bated hook or a hook set in a lure. There are also devices that have spring operated mechanisms that will release when a fish bites in an attempt to set the hook. Most of these devices are complicated and bulky. They are also costly to build and maintain. Therefore, they have not been widely accepted.

One such device for setting a hook is disclosed in U.S. Pat. No. 4,924,617 of Parent that discloses a hook setting device for securing a hook in a fish. The device employs a frame adapted for suspension above a body of water.

Another patent of Kim, U.S. Pat. No. 4,212,125, teaches the construction of a hook setting apparatus adapted to be securely attached to a fishing rod. The device has a hook setting attachment connected to the fishing line and attached securely to the fishing rod.

Another patent of Hahn, U.S. Pat. No. 4,522,572, discloses a device which indicates when a fish bites and also includes a hook setter adaptable to connect to the fishing line which is independent of the fishing pole, however, it does not teach the simple arrangement of the present invention.

It is therefore, one object of the present invention, to provide a hook setting device that uses the natural flexibility of a fishing pole as the setting force.

Yet another object of the present invention is to provide a hook setting apparatus having a trigger mechanism connected to a fishing line that uses the natural flexibility of a fishing pole to trigger the device when a fish bites.

Yet another object of the present invention is to provide a fish hook setting device having a simple trigger mechanism mounted on a post that may be conveniently mounted on a shore, beach or in a boat.

Still another object of the present invention is to provide a hook setting apparatus having a simple trigger mechanism comprised of a lever and a pin connected to a fishing line that is automatically released when a fish bites. The natural flexibility of a fishing pole applies an immediate driving force on the fishing line to set the hook.

Still another object of the present invention is to provide a hook setting apparatus with an optional feature of providing an audible alarm when a fish bites.

Yet another object of the present invention is to provide a hook setting apparatus of a simple trigger mechanism connected to a fishing line that is activated when a fish bites and uses the natural flexibility of a fishing pole to set the hook and includes an audible alarm that is set-off when the trigger is released.

Still another object of the present invention is to provide a hook setting apparatus that has a simple trigger mechanism that is safe and very easy to use.

Yet another object of the present invention is to provide a hook setting apparatus having a single simple trigger mechanism connected to the fishing line whose tension can be varied by varying the amount of bend in the pole tip to set the hook setting force.

Yet another object of the present invention is to provide a hook setting mechanism of a simple trigger mechanism for connecting to a fishing line and includes an elongate support that can be easily set-up.

BRIEF DESCRIPTION OF THE INVENTION

The purpose of the present invention is to provide a unique fishing apparatus that will automatically set a hook when a fish bites.

The apparatus is comprised of an elongate hollow post having a telescoping stake for mounting the post in the ground, such as on a river or lake shore, or a beach. The elongate stake is extended and driven into the ground.

The system includes a bracket having a trigger mechanism securely fastened to the upper end of the mounting post. The trigger mechanism includes a bracket with a pair of flanges for mounting a trigger and a latching release lever. The release lever is pivotally mounted on the end of one bracket with a trigger pin engaging a hole or slot in the trigger release lever. Tension, applied to the trigger pin set in a hole or slot on the release lever, holds the release lever in an upright vertical position. The slack end of a fishing line passes through a slot in the release lever after being secured to the trigger pin. The trigger pin is released by a force on the slack and of the line applied to the end of the release lever allowing the trigger pin to slip out of the hole or slot in the release lever.

The tension on the system, and the force for setting the hook, is applied through the fishing line and the natural flexibility of a fishing pole. The fishing line is secured around the trigger pin and is threaded through a slot in the release lever. The tip of the fishing pole is bent over when the fishing line is tied and will securely hold the trigger pin in the hole or slot in the release lever. The slack end of the line is then fed through a slot and the upper end of the release lever, which leads to a baited hook or lure cast into the river, lake or ocean.

When a fish grabs the end of the line, the line is pulled downward rotating the release lever and releasing the trigger pin. The fishing line is now released and the pole springs backward applying a strong force on the line setting the hook into the fishes' mouth. The line may then be reeled in with the fish securely hooked on the end of the line.

In an optional embodiment, an audible tone is provided by an alarm mounted on the trigger mounting bracket. The tone is comprised of any suitable tone generator operated by a battery. One end is grounded to the bracket while the other end is connected by a wire to a terminal adjacent to the release lever. When the release lever is tripped, it falls on the terminal completing the circuit and activating the audible alarm. Therefore, if the fisherman should be dozing or away from his position, he will hear the audible alarm indicating the trigger has been released and a fish has been caught.

In another optional, but preferred embodiment of the invention, a unique pole holder is provided to hold a fishing pole in an upright position to apply tension by flexing the tip of the pole. The pole holder is comprised of a hollow post having a telescoping stake for driving the pole holder into the ground. A cup, mounted on a lower end of the pole, receives the butt end of a fishing pole while an upper, partially cylindrical bracket prevents the pole from falling out of the pole holder. The upper bracket is open along one side to easily remove the pole from the pole holder when a fish bites on the line. The configuration of the upper pole holding bracket prevents the pole from being thrown out of the pole holder when the trigger mechanism releases the line. The release of the trigger mechanism causes the pole to snap sharply backward applying a strong force to the fishing line. The configuration of the pole holder prevents the pole from becoming dislodged.

In yet another optional, but preferred embodiment of the invention, a bracket is provided for mounting the apparatus on a boat. The bracket is a simple post that can be securely fastened to the bulkhead of the boat. Preferably, sockets can be provided on the bulkhead of the boat for receiving the post.

In still another optional, but preferred feature of the invention for use with the boat mounted apparatus, an extension arm is provided on the trigger mounting bracket. The extension includes an adjustable gripper that is adjustable to pinch the line and maintain some slack when trolling in a boat. When a fish bites on the end of a line, the line will first be released by the grip and then release the trigger release lever. The pole will then snap sharply backward applying a strong force to the line setting the hook.

The above and other novel features of the invention will be more fully understood from the following detailed description and the accompanying drawings, in which:

BRIEF DESCRIPTION OF THE DRAWINGS

FIG. 2 is a detailed side elevation of a hook setting apparatus used in FIG. 1.

FIG. 3 is a top view of the hook setting apparatus of FIG. 3.

FIG. 3a is a partial sectional view of an optional trigger mechanism according to the invention.

FIG. 4 is a side elevation of the hook setting apparatus according to the invention, including an audible alarm.

FIG. 5 is a side elevation of a pole holder for use with the invention.

FIG. 6 is a sectional view taken at 6—6 of FIG. 5.

FIG. 7 illustrates an optional embodiment of hook setting apparatus for use on a boat.

FIG. 8 is a sectional view taken at 8—8 of FIG. 7.

FIG. 9 is a sectional view taken at 9—9 of FIG. 8.

DETAILED DESCRIPTION OF THE INVENTION

Figure 1:
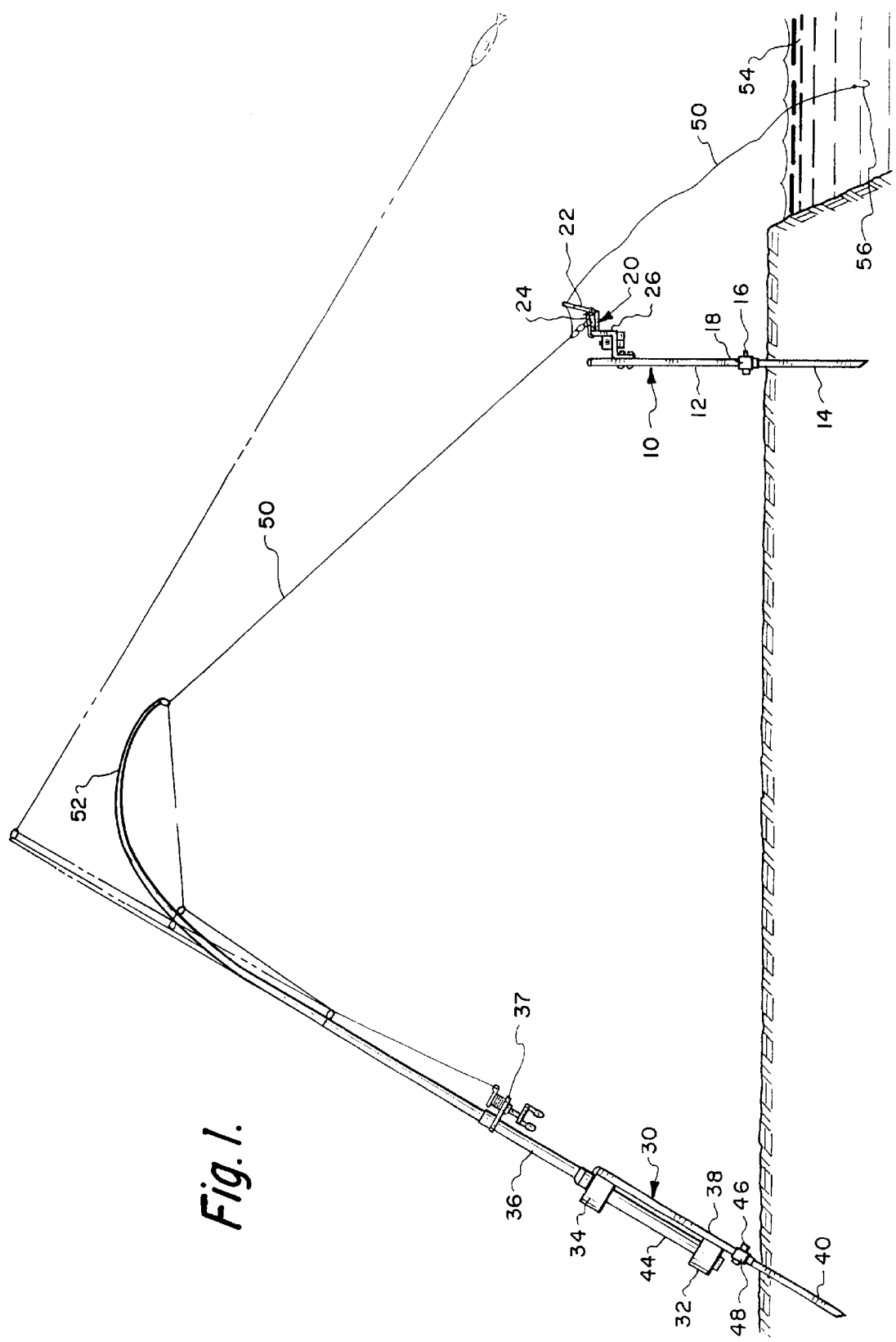
FIG. 1 is a side elevation of the hook setting apparatus set-up to catch a fish.

A hook setting apparatus, constructed according to the invention, is illustrated in FIG. 1. Hook setting apparatus 10 is comprised of a hollow post 12 and a telescoping stake 14 for mounting post 12 on the shore of a lake, river or ocean. To set-up the system, stake 14 is extended from hollow post 12 and locked in position by pin 16, held in place by elastic lock 18. Stake 14 can then be driven into the ground, securely holding post 12 in an upright position. A trigger release mechanism 20 is provided comprised of trigger release lever 22, and an elongate trigger release pin 24 mounted on trigger support brackets. Brackets 26 and 27 form the trigger release support platform.

An optional, but preferred feature of the invention, is the inclusion of a unique pole holder 30, having a cup 32 and a bracket 34 for securely mounting a fishing pole 36. Pole holder 30 has a post 38 and a telescoping mounting stake 40 similar to that shown and described with respect to hook setting apparatus 10. A pin 46 and elastic lock 44 holds stake 48 in an extended position. Fishing pole 36 is mounted in pole holder 30 with butt 44 seated in cup 32, and the upper end of the rod handle fitting in pole holding bracket 34. The use of pole holder 30 is advantageous because it allows complete hands-free operation for the fisherman. Alternatively, the pole 36 would be held by the fisherman or mounted in any suitable pole mounting apparatus.

Fishing pole 36 is first securely set in pole holder 30. The hook setting apparatus is set-up so that fishing line 50, coming from reel 37, is securely mounted in trigger release mechanism 20 of hook setting apparatus 10 with tip 52 of fishing pole 36 bent to apply tension on line 50. Fishing line 50 is tied or wrapped around pin 24, which is then passed through lever 22 with the remaining slack line loosely extending into water 54 through slot 76. Line 50 is set in trigger mechanism 20 after baited hook or line 56 is cast into water 54. The system is ready to catch a fish as will be described in greater detail hereinafter.

Hook setting apparatus 10 is shown in greater detail in FIG. 2. Trigger release mechanism 20 is comprised of trigger mounting bracket 26 and 27 securely fastened to post 12 by bolts 58 and nuts 60, or any other suitable means such as welding. Trigger mounting bracket 26 and 27 has trigger release lever flange 62 and trigger pin flange 64 for mounting trigger release lever 22 and trigger pin 24. Trigger release lever 22 is rotably mounted in slot 66 in trigger release lever flange 62. End 68, of trigger release lever 22, has a hole 70 for receiving the end of trigger pin 24. The opposite end of trigger pin 24 has a loop 72 fitting in a hole in trigger pin flange 64. An additional trigger release mechanism 20 may be mounted on post 12 if desired for use with an additional fishing pole and line.

The actuating end of trigger release lever 22 has a slot 74 for receiving fishing line 50. Preferably, slot 74 has a size that will slightly squeeze a fishing line 50 to prevent it from easily becoming dislodged. A resilient plastic cap 76 is fitted over the end of trigger release lever 22 to prevent chaffing of line 50.

Line 50 is secured around trigger pin 24 by a knot 80 that allows the line to easily slip off pin 24 when released from hole 70 of trigger release 22. Preferably, knot 80 is nothing more than a few twists of line 50 with the loop formed at the end, bent back on itself and then slipped over trigger pin 24. This type of arrangement is sometimes referred to as a "ring hitch knot." There is no real knot in the line, but simply a few loops twisted and bent back to fit over a cylindrical pin. When trigger pin 24 is released from hole 70 in trigger release 22, knot 80 easily slips off the end of pin 24 and opens. This type of connection prevents any knots from forming in line 50.

The length of trigger pin 24 is selected to allow adjustment of the sensitivity of the trigger mechanism. Sliding line 50 forward or back, after attachment to trigger pin 24 either toward trigger release lever 22 or toward loop 72, increases or decreases the sensitivity. This feature is advantageous because it allows the sensitivity to be decreased if slight "bumps" on the hook or line accidentally set-off the trigger mechanism.

Trigger pin 24 is shown engaging hole 70 in trigger release lever 22 in FIG. 3. However, a trigger release mechanism could be provided as shown in FIG. 3a. In this embodiment, trigger release pin 24 engages slot 82 in the side of trigger release lever 22 rather than a hole 70 as shown in FIG. 3. While this embodiment may allow the trigger release pin to be more easily set, it is less desirable because release pin 24 may slide out the side of slot 82.

Another option is to include an audible alarm in the hook setting apparatus. An audible alarm may be provided by an audible alarm 84 mounted on trigger mounting bracket 26 and operated by a battery 86. Audible alarm 84 may be any suitable, battery operated speaker and electronic circuit. Audible alarm 84 is connected to one end of battery 86 by wire 88, connected to battery mounting bracket 90. The opposite end of battery 86 is connected by wire 92 and terminates at terminal 94. The end of wire 92 is connected to, but insulated from, trigger release lever bracket 62. Preferably, audible alarm 84 has a reset button 96 to deactivate the alarm once it has been set-off.

The construction and operation of hook setting mechanism 10 can be seen by reference to FIG. 1 and the partial sectional view of FIG. 4 in which the trigger mechanism has been released. With the hook setting apparatus 10 and pole holder 30 set-up as shown in FIG. 1, the baited hook or line 56 is cast into water 54 and the pole set in pole holder 30. As shown in FIG. 2, line 50, is then tied by a hitch ring knot around trigger pin 24 with pole 36 bent over as shown in FIG. 1. The end of trigger pin 24 is then inserted in a hole 70 of trigger release lever 22 with the knot positioned on trigger pin 24 to adjust the sensitivity as desired. Hook setting apparatus 10 is set-up by extending stake 14 and pin 16 in hole 17 in post 12 secured by flexible pin guard or lock 18 that wraps around post 12. An additional hole 19, in an upper portion of post 12, allows stake 15 to be held in a retracted position.

With hook setting apparatus 10 mounted on the shoreline, line 50 is fastened to pin 24 set in hole 70 of trigger release 22. Line 50 is pulled downward until pole 36 bends at 52 (FIG. 1) to apply tension to the line. The amount of tension applied depends upon the amount of force applied to the line when it is attached to trigger pin 24. A ring hitch knot is formed in line 50, as shown in FIG. 2 and the loop at the end folded over and slipped over pin 24. It is then set in hole 70 of trigger release lever 22. The tension on line 50 holds trigger pin 24 securely in hole 70. The slack end of line 50 is then passed through slot 74 of trigger release lever 22 allowing hook 56 to dangle freely in water 54. When a fish bites on hook 56, the force applied to the slack end of line 50 pulls trigger release lever 22 over or downward as shown in FIG. 4, releasing line 50. Tip 52, of fishing pole 36, will then snap sharply backward applying a strong force to line 50 setting hook 56 in the mouth of the fish.

When trigger release lever 22 is tripped by line 50, it falls (as shown in FIG. 4) until it contacts terminal 94, connected by electrical wire 92 to battery 86. This completes the circuit for setting off alarm 84. If the fisherman is not watching his line, this will alert him that the trigger mechanism has been activated and a fish is on his line.

The construction of the unique pole holder is illustrated in FIGS. 5 and 6. Pole holder 30 is comprised of a hollow post 38, having a telescoping stake 40 secured by pin 46 and elastic lock 48. When stake 40 is retracted inside post 38, pin 46 and elastic lock are positioned in hole 49. Pole holder 30 has a cup 32 to support butt end 44 of pole 36. The upper end of the pole handle sits in pole holding bracket 34, having open side 35. The pole holder is constructed with an open sided bracket 34 so that when the trigger mechanism releases, the pole will not be thrown out of the pole holder. The backward flexing action of pole 36 will throw the pole against the rear of bracket 34 keeping it in pole holder 30. The pole may now be easily removed by lifting it out of cup 32 and moving it sideways through slot or opening 35 in bracket 34.

An optional embodiment for use on boats is illustrated in FIGS. 7 through 9. The hook setting apparatus 110 is comprised of a post 112, constructed for mounting on the bulkhead or hull of a boat. Suitable brackets (not shown) can be mounted on the bulk head of a boat for receiving post 112. A trigger release mechanism 125 comprised of mounting brackets 126 and 127 is mounted on post 112 as before, and may be fastened by any suitable means such as welding or bolting. Trigger release mechanism 125 has trigger lever flange 128 and trigger pin flange 130 for mounting trigger release lever 132 and trigger pin 134, which operate in the same manner as the embodiment illustrated in FIGS. 2 and 4.

An optional, but preferred feature of the boat mounted apparatus is the inclusion of line holding extension 136 having a line holding grip 138 for holding the slack end of line 50. This arrangement is similar to the outriggers used on boats for trolling purposes. It prevents premature release of trigger release lever 132 until a fish has grabbed the hook on the end of line 50.

Preferably, line grip 138 is adjustable, and is comprised of grip brackets 140 and 142 secured to line holding extension 136 by bolt 144 and thumbscrew 146. A resilient insert 148, on the ends of grip brackets 140 and 142, form a slot 150 for pinching and holding line 50. The amount of gripping force in slot 150 is adjusted by thumbwheel 152 mounted on bolt 154.

Thus, the boat system is set-up by setting the trigger as described hereinabove, then allowing a little slack in the line between trigger release lever 132 and grip 138. The line is then placed in slot 150 and grip 138 and thumbwheel 152 tightened to securely hold the line sufficiently for trolling purposes. The higher the speed of the boat, the more drag on the line which requires an increase in the clamping force or pinching force in slot 150 in grip 138. This is achieved by simply rotating thumbwheel 152 clockwise to narrow slot 150 securely pinching line 50.

The boat mounted hook setting apparatus is set-up similar to that shown in FIG. 1, with the rod in a suitable holder mounted on the hull. The line is then twisted several times with the loop folded back on itself to form a knot 135, slipped over the end of trigger pin 134. The end of pin 134 is then set in trigger release lever 132 as before, with line 50 passed through the slot in the end 133 of trigger release lever 132. If the boat is anchored, line 50 can simply hang over the side of the boat with the baited hook or lure dangling in the water. If, however, the boat is trolling, the line will be passed through grip 138 which will be adjusted to apply the amount of force needed to prevent premature activation of the hook setting apparatus.

Thus, there has been disclosed a unique hook setting apparatus that utilizes the natural flexibility of a fishing pole to effectively set a hook in a fish. The hook setting mechanism is comprised of a trigger pin and a trigger release lever holding the end of the trigger pin against the tension in a line. A tug or pull on the line by a fish, grabbing the hook, releases the trigger release lever allowing the line to slip off the trigger pin. This allows the pole to snap sharply backwards, applying considerable force on the line to set the hook in the fishes' mouth. In one embodiment the trigger pin fits in a hole on the trigger release lever while in another, the trigger pin fits in a slot. In yet another embodiment, an audible alarm is provided that is set off by the trigger release lever completing a circuit. In still another embodiment, a boat mounted hook setting apparatus includes a line extension and a grip for use in trolling. It prevents the drag on the line from prematurely setting off the hook setting mechanism.

This invention is not to be limited by the embodiment shown in the drawings and described in the description which is given by way of example and not of limitation, but only in accordance with the scope of the appended claims.

What is claimed is:

1. An automatic fish hook setting apparatus comprising:

a pivotable pin;

a release plate having retaining means for retaining said pivotable pin in a fixed position;

a fishing line from a fishing pole releasably wrapped around said pivotable pin with said fishing pole held in a severely arched position, said pivotable pin being releasably retaining in said retaining means by the force applied to said fishing line;

said fishing line being draped over said release plate after being releasably wrapped around said pivotable pin;

whereby a force applied to a fish hook on the end of said fishing line trips said release plate releasing said pivotable pin and fishing line causing the preloaded force of said severely arched fishing pole to be applied to said fishing line to set said fish hook.

2. The apparatus according to claim 1 including line gripping means for frictionally gripping said line when said hook setting apparatus is used for trolling on a boat.

3. The apparatus according to claim 2 in which said line gripping means comprises an extension bracket mounted on said trigger pin and releasing lever bracket; adjustable grip means mounted on said extension bracket for receiving a slack fishing line between said releasing lever and said hook.

4. The apparatus according to claim 3 in which said grip means comprises a pair of upper and lower grip plates; resilient gripping pads mounted on an outboard end between said plates forming a line receiving slot; and adjusting means for adjusting the spacing of said slot to vary the friction on a line in said slot between said grip pads.

5. The apparatus according to claim 4 in which said adjusting means comprises a bolt through said upper and lower grip plates; a thumbwheel on said bolt for opening and closing said slot to vary the friction on a line in said slot.

6. The apparatus according to claim 1 in which said pivotable pin is an elongate cylindrical pin having a loop on one end for rotatably attaching said pivotable pin to said mounting bracket; whereby the sensitivity of said hook setting apparatus may be adjusted by adjusting the position of said fishing line on said pivotable pin.

7. The apparatus according to claim 6 including an audible alarm for activating an audible signal when said release plate is tripped.

8. The apparatus according to claim 7 in which said audible alarm comprises a battery operated audible alarm mounted on said pivotable pin and release plate bracket; a connecting terminal adjacent said release plate; said connecting terminal being connected to complete a circuit when said release plate is tripped.

9. The apparatus according to claim 1 in which said release plate includes; line engaging means for engaging and holding said fishing line draped over said release plate in position between said pivotable pin and said hook.

10. The apparatus according to claim 9 in which said line engaging means comprises a notch in an end of said release plate.

11. The apparatus according to claim 10 in which said retaining means comprises an aperture in said release plate engaging an end of said pivotable pin; said pivotable pin being held in engagement with said aperture in said release plate by tension in said fishing line.

12. The apparatus according to claim 11 in which said release plate is a rotatable plate; said aperture comprises a hole in said rotatable plate means near an end opposite said notch in a free end of said rotatable plate.

13. The apparatus according to claim 12 including resilient means covering said free end and notch in said rotatable plate for gripping and holding said fishing line draped over the front end of said rotatable plate.

14. The apparatus according to claim 13 including mounting means for mounting said pivotable pin and said release plate; said mounting means comprising; a post; and a mounting bracket on said post for mounting said pivotable pin and said release plate.

15. The apparatus according to claim 14 in which said post includes a stake for mounting said post in the ground.

16. The apparatus according to claim 15 in which said post is hollow; said stake being telescopically fitted in said hollow post.

17. The apparatus according to claim 16 including locking means for locking said stake in an extended or retracted position is said post.

18. The apparatus according to claim 17 in which said locking means comprises a pair of spaced apart holes in said post; a hole in said stake; a locking pin passing through one of said holes in said post and said hole in said stake to hold said stake in an extended or retracted position; an elastic locking guard stretching around said post and over the end of said pin to secure said pin in said post.

19. The apparatus according to claim 18 including an audible alarm; activating means for activating said audible alarm when said release is tripped.

20. The apparatus according to claim 19 in which said audible alarm comprises a battery operated audible alarm mounted on said pivotable pin and release plate bracket; a connecting terminal adjacent said release plate; said connecting terminal being connected to complete a circuit when said release plate is tripped.

21. The apparatus according to claim 18 including a fishing pole holding means for holding said fishing pole in said flexed position with said fishing line connected to said pivotable pin.

22. The apparatus according to claim 21 in which said fishing pole holding means comprises; a post; a cup mounted on said post to receive the butt end of a fishing pole; and a pole restraining bracket mounted on said post above said cup; said pole restraining bracket constructed to restrain said pole from falling out of said pole holder when said line is released.

23. The apparatus according to claim 22 in which said restraining bracket is a partial cylinder open on one side to allow easy removal of said pole from said pole holder while preventing said fishing pole from falling out of said pole holder when said line is released.

* * * * *